United States Patent
Weiss et al.

(10) Patent No.: US 10,817,827 B1
(45) Date of Patent: *Oct. 27, 2020

(54) DRIVE-THRU SYSTEM IMPLEMENTING LOCATION TRACKING

(71) Applicant: WALGREEN CO., Deerfield, IL (US)

(72) Inventors: Benjamin Weiss, Chicago, IL (US); Nicholas L. Eby, Downers Grove, IL (US)

(73) Assignee: WALGREEN CO., Deerfield, IL (US)

( * ) Notice: Subject to any disclaimer, the term of this patent is extended or adjusted under 35 U.S.C. 154(b) by 512 days.

This patent is subject to a terminal disclaimer.

(21) Appl. No.: 15/856,395

(22) Filed: Dec. 28, 2017

Related U.S. Application Data

(63) Continuation of application No. 14/530,179, filed on Oct. 31, 2014, now Pat. No. 9,904,903.

(51) Int. Cl.
    *G06Q 10/08* (2012.01)
(52) U.S. Cl.
    CPC ............... *G06Q 10/0836* (2013.01)
(58) Field of Classification Search
    CPC .................................. G06Q 10/0836
    See application file for complete search history.

(56) References Cited

U.S. PATENT DOCUMENTS

| | | |
|---|---|---|
| 6,439,345 B1 | 8/2002 | Recktenwald et al. |
| 6,711,460 B1 | 3/2004 | Reese |
| 8,170,909 B2 | 5/2012 | Brown et al. |

(Continued)

FOREIGN PATENT DOCUMENTS

| | | | |
|---|---|---|---|
| WO | WO-2010/005730 A2 | 1/2010 | |
| WO | WO-2010005730 A2 * | 1/2010 | ............. G06Q 10/02 |

OTHER PUBLICATIONS

Elgan, Mike; "Why Apple's Indoor GPS Plan is Brilliant" (Computer World, pp. 1-2, Sep. 13, 2013) https://www.computerworld.com/article/2485049/mobile-payments/why-apple-s--indoor-gps--plan-is-brilliant.html (Year: 2013).*

(Continued)

*Primary Examiner* — Michael P Harrington
*Assistant Examiner* — Bryan J Kirk
(74) *Attorney, Agent, or Firm* — Marshall, Gerstein & Borun LLP; Randall G. Rueth

(57) ABSTRACT

Embodiments are disclosed to determine customer's prescription information and their position while waiting in a drive-thru lane. The drive-thru lane may have one or more transmitters installed at predetermined locations. By utilizing an application installed on each customer's mobile computing device, each mobile computing device may transmit customer information and ranging data when within range of one or more of the transmitters. The ranging data may include an indication of a range between each of the customer's mobile computing device and one or more proximate transmitters. By correlating the customer information to prescription information from recently filled and/or called in prescriptions, each customer's prescription order may be retrieved. Furthermore, by analyzing the ranging data, the position of each customer in the drive-thru lane may be determined. A drive-thru computing device is disclosed that may display each customer's position in the drive-thru lane along with their prescription order information.

20 Claims, 6 Drawing Sheets

(56) References Cited

U.S. PATENT DOCUMENTS

| | | |
|---|---|---|
| 8,626,530 B1 | 1/2014 | Tran et al. |
| 8,758,238 B2 | 6/2014 | Clapp |
| 9,264,151 B1 | 2/2016 | Emigh et al. |
| 9,430,781 B1* | 8/2016 | Kerr .................... H04B 17/318 |
| 9,824,323 B1 | 11/2017 | Weiss et al. |
| 2002/0016740 A1 | 2/2002 | Ogasawara |
| 2002/0128850 A1 | 9/2002 | Chen et al. |
| 2002/0128863 A1 | 9/2002 | Richmond |
| 2002/0143592 A1 | 10/2002 | Nishikawa et al. |
| 2002/0178107 A1 | 11/2002 | Biancavilla |
| 2003/0028399 A1 | 2/2003 | Davis et al. |
| 2003/0195821 A1* | 10/2003 | Kennamer .......... G06Q 10/087 705/26.1 |
| 2004/0266335 A1 | 12/2004 | Usui et al. |
| 2005/0136845 A1 | 6/2005 | Masuoka et al. |
| 2006/0111053 A1 | 5/2006 | Wu et al. |
| 2006/0111941 A1 | 5/2006 | Blom |
| 2007/0088624 A1 | 4/2007 | Vaughn et al. |
| 2007/0184852 A1 | 8/2007 | Johnson et al. |
| 2008/0059227 A1 | 3/2008 | Clapp |
| 2008/0097769 A1 | 4/2008 | Galvin et al. |
| 2008/0149721 A1 | 6/2008 | Shadwell |
| 2008/0255929 A1 | 10/2008 | Mouton |
| 2009/0112683 A1 | 4/2009 | Hamilton, II et al. |
| 2010/0020776 A1 | 1/2010 | Youssef et al. |
| 2010/0038416 A1 | 2/2010 | Canora |
| 2010/0098036 A1 | 4/2010 | Li |
| 2010/0159980 A1 | 6/2010 | Mikan et al. |
| 2010/0161356 A1 | 6/2010 | Louie et al. |
| 2010/0280911 A1 | 11/2010 | Roberts et al. |
| 2011/0028161 A1 | 2/2011 | Larsen |
| 2011/0139545 A1* | 6/2011 | Bridgman ................ E04H 14/00 186/41 |
| 2011/0166878 A1 | 7/2011 | Louie et al. |
| 2011/0221568 A1 | 9/2011 | Giobbi |
| 2011/0257989 A1 | 10/2011 | Kumar |
| 2012/0023171 A1 | 1/2012 | Redmond |
| 2012/0030726 A1 | 2/2012 | Winter et al. |
| 2012/0115512 A1 | 5/2012 | Grainger et al. |
| 2012/0185263 A1 | 7/2012 | Emert |
| 2012/0239417 A1 | 9/2012 | Pourfallah et al. |
| 2012/0253831 A1 | 10/2012 | John et al. |
| 2013/0006663 A1* | 1/2013 | Bertha .................. H04W 4/021 705/3 |
| 2013/0006718 A1 | 1/2013 | Nielsen et al. |
| 2013/0226704 A1 | 8/2013 | Fernandez |
| 2013/0256403 A1 | 10/2013 | Mackinnon Keith |
| 2013/0317944 A1 | 11/2013 | Huang et al. |
| 2014/0054381 A1 | 2/2014 | Cha et al. |
| 2014/0074743 A1* | 3/2014 | Rademaker .......... G06Q 10/083 705/334 |
| 2014/0089111 A1 | 3/2014 | Fernandez |
| 2014/0143060 A1 | 5/2014 | Fernandez |
| 2014/0180817 A1 | 6/2014 | Zilkha |
| 2014/0200937 A1 | 7/2014 | Friedman |
| 2014/0365304 A1 | 12/2014 | Showers et al. |
| 2015/0095161 A1 | 4/2015 | Goel |
| 2015/0112774 A1 | 4/2015 | Georgoff et al. |
| 2015/0134429 A1 | 5/2015 | Katakwar et al. |
| 2015/0178798 A1 | 6/2015 | Garforth-Bles |
| 2015/0221010 A1 | 8/2015 | Ming |
| 2015/0294084 A1 | 10/2015 | McCauley et al. |
| 2015/0363816 A1 | 12/2015 | Poglitsch |
| 2017/0046753 A1 | 2/2017 | Deupree, IV |

OTHER PUBLICATIONS

Elgan, Why Apple's Indoor GPS Plan is Brilliant, Computer Word, 8 pp. (Sep. 13, 2013).
U.S. Appl. No. 13/286,909, filed Nov. 1, 2011.
U.S. Appl. No. 13/286,909, Final Office Action, dated Aug. 31, 2016.
U.S. Appl. No. 13/286,909, Final Office Action, dated Jul. 16, 2013.
U.S. Appl. No. 13/286,909, Final Office Action, dated Jun. 26, 2015.
U.S. Appl. No. 13/286,909, Final Office Action, dated Nov. 3, 2017.
U.S. Appl. No. 13/286,909, Nonfinal Office Action, dated Dec. 18, 2015.
U.S. Appl. No. 13/286,909, Nonfinal Office Action, dated Jan. 17, 2013.
U.S. Appl. No. 13/286,909, Nonfinal Office Action, dated Mar. 24, 2017.
U.S. Appl. No. 13/286,909, Nonfinal Office Action, dated Nov. 20, 2014.
U.S. Appl. No. 14/249,492, Advisory Action, dated Oct. 2, 2017.
U.S. Appl. No. 14/249,492, filed Apr. 10, 2014.
U.S. Appl. No. 14/249,492, Final Office Action, dated Jul. 14, 2016.
U.S. Appl. No. 14/249,492, Final Office Action, dated Jun. 19, 2017.
U.S. Appl. No. 14/249,492, Nonfinal Office Action, dated Dec. 19, 2016.
U.S. Appl. No. 14/249,492, Nonfinal Office Action, dated Feb. 19, 2016.
U.S. Appl. No. 14/288,087, filed May 27, 2014.
U.S. Appl. No. 14/288,087, Final Office Action, dated Aug. 25, 2016.
U.S. Appl. No. 14/288,087, Final Office Action, dated Jul. 16, 2015.
U.S. Appl. No. 14/288,087, Nonfinal Office Action, dated Dec. 18, 2015.
U.S. Appl. No. 14/288,087, Nonfinal Office Action, dated Jul. 27, 2017.
U.S. Appl. No. 14/288,087, Nonfinal Office Action, dated Mar. 27, 2015.
U.S. Appl. No. 14/456,713, filed Aug. 11, 2014.
U.S. Appl. No. 14/456,713, Final Office Action, dated Mar. 10, 2017.
U.S. Appl. No. 14/456,713, Nonfinal Office Action, dated Dec. 1, 2016.
U.S. Appl. No. 14/456,713, Notice of Allowance, dated Jul. 3, 2017.
U.S. Appl. No. 14/526,887, filed Oct. 29, 2014.
U.S. Appl. No. 14/526,887, Nonfinal Office Action, dated Oct. 6, 2017.
U.S. Appl. No. 14/530,179, Nonfinal Office Action, dated May 17, 2017.
U.S. Appl. No. 14/530,179, Notice of Allowance, dated Nov. 22, 2017.
U.S. Appl. No. 15/142,557, filed Apr. 29, 2016.
U.S. Appl. No. 14/530,179, filed Oct. 31, 2014.

* cited by examiner

| ID NUMBER | RANGING DATA - Transmitter 108.3 |
|---|---|
| 9132654 (CAR 110.2) | -85 dBm |
| 2348938 (CAR 110.1) | -99 dBm |
| 3265915 (CAR 110.3) | -72 dBm |

| POSITION 1 | ID# 3265915 (CAR 110.3) |
|---|---|
| POSITION 2 | ID# 9132654 (CAR 110.2) |
| POSITION 3 | ID# 2348938 (CAR 110.1) |

| ID NUMBER | RANGING DATA - Transmitter 108.3 |
|---|---|
| 3265915 (CAR 110.3) | -72 dBm |
| 9132654 (CAR 110.2) | -86 dBm |
| 2348938 (CAR 110.1) | -88 dBm |

| ID NUMBER | RANGING DATA - Transmitter 108.2 |
|---|---|
| 3265915 (CAR 110.3) | -75 dBm |
| 9132654 (CAR 110.2) | -65 dBm |
| 2348938 (CAR 110.1) | -77 dBm |

| ID NUMBER | RANGING DATA - Transmitter 108.1 |
|---|---|
| 3265915 (CAR 110.3) | -92 dBm |
| 9132654 (CAR 110.2) | -84 dBm |
| 2348938 (CAR 110.1) | -68 dBm |

| POSITION 1 | ID# 3265915 (CAR 110.3) |
|---|---|
| POSITION 2 | ID# 9132654 (CAR 110.2) |
| POSITION 3 | ID# 2348938 (CAR 110.1) |

— 500

| Drive-Thru Application | Store 1072 | 10:23 AM |

502

Position #1
Jane Doe
Patient ID# 2348938
1341 White Picket Ln
Deerfield, IL 60015
(847) 555-7672

Ready for Pickup (3)
Rx Num: 151494-1000
Lyrica 20mg
Rx Num: 194230-1000
Lipitor 10mg
Rx Num: 804753-1000
Tylenol 500mg 504.1

Position #2
John Smith
Patient ID# 9132654
345 E. 42$^{nd}$ St.
Highland Park, IL
(847) 555-7836

Ready for Pickup (1)
Rx Num: 156248-1000
Oxycontin 10mg

**\*\*\* CUSTOMER ID REQUIRED \*\*\***

504.2

Position #3
Alice Brown
Patient ID# 3265915
10 N. Main St.
Northfield, IL 60013
(847) 555-1025

Ready for Pickup (1)
Rx Num: 151784-1000
Paxil 40mg 504.3

DRIVE-THRU SYSTEM IMPLEMENTING LOCATION TRACKING

CROSS-REFERENCE TO RELATED APPLICATIONS

This application is a continuation of U.S. patent application Ser. No. 14/530,179, filed on Oct. 31, 2014, the disclosure of which is incorporated herein by reference in its entirety.

TECHNICAL FIELD

The present disclosure relates generally to location tracking, and more particularly, to tracking customer positions within a drive-thru lane.

BACKGROUND

In many cases, a pharmacy customer will order a prescription refill in advance of his or her visit to the pharmacy to pick up the refill. In other cases, a prescription for an initial supply may, for example, have already been called in by the customer's doctor. Generally, the customer's order will then be filled, packaged, and stored until the customer visits the pharmacy to pick up the order.

To make the prescription pickup and payment process more convenient for the customer, some pharmacies have implemented drive-thru prescription pickup services. Drive-thru prescription pickup services typically allow a customer to remain in his vehicle while being serviced at a drive-thru window to pick up his prescription. The drive-thru pickup process generally involves the customer communicating with pharmacy staff using a speaker and microphone located outside of the pharmacy at the start of a drive-thru lane. Once the pharmacy staff receives the customer information by speaking to the customer, the pharmacy staff may fill the prescription order, wait until the vehicle pulls up near a drive-thru window, hand the customer his prescription order, and process the payment.

However, conventional drive-thru systems often suffer from inefficiencies since several may be in line in a drive-thru lane at the same time. Because some prescriptions may take longer to fill than others, pharmacy staff may need to rush to fill larger prescription orders at the expense of making other customers in line wait longer to receive their prescriptions. In addition, traditional drive-thru prescription pickup services receive customer information and prescription order information by speaking to each customer as she pulls through the drive-thru lane. This interaction further slows the pickup process, as time is needed to enter each customer's information, lookup their prescription information, and locate the prescription order.

As a result, streamlining the drive-thru prescription pickup process may provide additional convenience for customers but also presents several challenges.

SUMMARY

In some embodiments, methods, apparatus, systems, and non-transitory media are described to determine a customer's prescription information and their position in a drive-thru lane. The drive-thru lane may have one or more transmitters installed at one or more predetermined locations. By utilizing an application installed on each customer's mobile computing device, each mobile computing device may transmit customer information and ranging data when within range of one or more of the transmitters. The ranging data may include an indication of a range between each of the customer's mobile computing device and one or more proximate transmitters. By correlating the customer information to prescription information from recently filled and/or called-in prescriptions (e.g., those received in the last hour), each customer's prescription order may be retrieved. Furthermore, by analyzing the ranging data, the position of each customer in the drive-thru lane may also be determined. A drive-thru computing device is disclosed that may display each customer's position in the drive-thru lane along with their prescription order information.

In additional embodiments, the drive-thru computing device may receive the customer information and ranging data directly from each mobile computing device while operating in a peer-to-peer mode. In such embodiments, one or more of the mobile computing devices may communicate with one or more back-end components to retrieve each customer's prescription order information and then transmit the prescription order information to the drive-thru computing device. In accordance with peer-to-peer communication embodiments, the retail store or pharmacy operating the drive-thru system may operate offline and without the need to access or otherwise utilize a common back-end application.

In further embodiments, the drive-thru computing device may receive the customer information and ranging data through a communication network from one or more back-end components while operating in a network communications mode. In such embodiments, one or more of the mobile computing devices may communicate with one or more back-end components to send the customer information and/or ranging data to the back-end components. Further in accordance with these embodiments, the drive-thru computing device may retrieve each customer's prescription order information, customer information, and ranging data from the one or more back-end components. In accordance with network communication embodiments, the retail store or pharmacy operating the drive-thru system may utilize a common back-end application running on one or more of the back-end components.

In still additional embodiments, methods, apparatus, systems, and non-transitory media are described that utilize one or more timestamps indicating when the one or more mobile computing devices received signals transmitted by the one or more transmitters. By analyzing the timestamps and the ranging data, customer dwell times may be calculated based upon how long a customer has remained in the same position in a drive-thru lane. Furthermore, overall customer service times may be calculated through an analysis of the timestamps and an indication of when the customer's prescription order was processed. Future service times may be predicted by performing analytics on the dwell times and/or service times. Customers may be notified in advance of visiting the retailer with an estimate of these predicted times.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIG. 4A is a block diagram of an exemplary set of ranging data 400 used to determine customer locations within a drive thru lane using a single transmitter, according to an embodiment;

FIG. 4B is a block diagram of an exemplary set of ranging data 450 used to determine customer locations within a drive thru lane using multiple transmitters, according to an embodiment;

FIG. 5 illustrates an exemplary drive-thru computing device screen 500, according to an embodiment.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

The following disclosure describes several embodiments in the context of a pharmacy and drive-thru prescription pickup system. However, the embodiments described throughout the disclosure may also be applicable to any suitable type of drive-thru system in which customers pick up orders. For example, various embodiments may include determining the location of vehicles in a restaurant drive-thru lane. As will be appreciated by those of ordinary skill in the relevant art(s), the customer information and/or the order information may change based upon a particular application. For example, a restaurant may receive a customer's name and food order instead of determining recently filled prescriptions associated with the customer. Furthermore, depending on a particular application, the customer's order information may be entered on his mobile computing device in conjunction with a mobile application. In such alternate applications of the disclosed embodiments, an applicable computing device may receive the customer's and/or the order information from the customer's mobile computing device directly in a peer-to-peer fashion, or indirectly, via network communications between the computing device and the mobile computing device through one or more back-end components.

Figure 1:
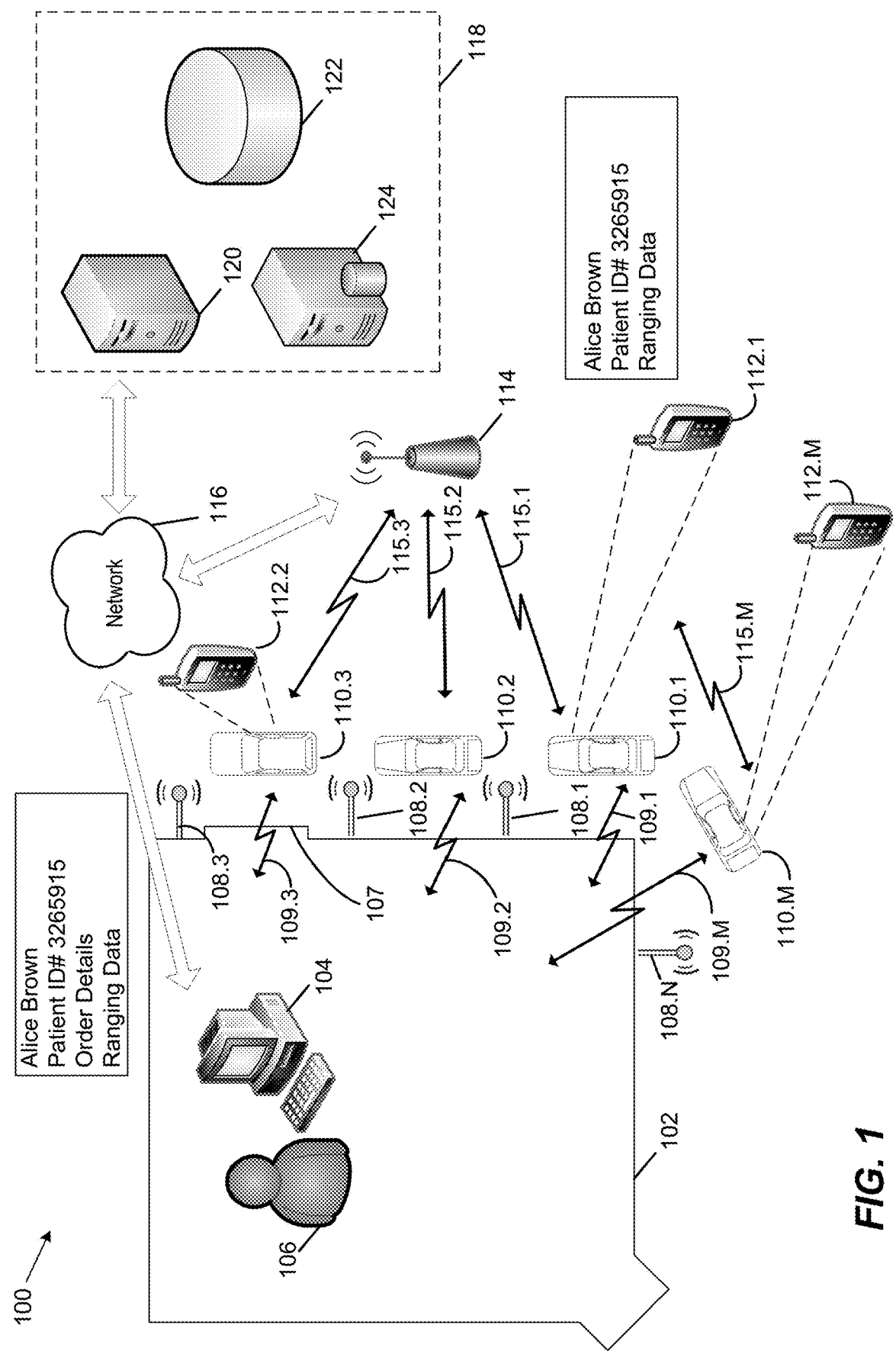
FIG. 1 is a block diagram of an exemplary drive-thru pickup system 100 in accordance with an embodiment of the present disclosure.

FIG. 1 is a block diagram of an exemplary drive-thru pickup system 100 in accordance with an embodiment of the present disclosure. Drive-thru pickup system 100 includes a retail store 102, a retail computing device 104, which may be operated by a user 106, such as a retail store employee, for example, 'N' number of transmitters 108.1-108.N, 'M' number of vehicles 110.1-110.M and computing devices 112.1-112.M, a base station 114, a communication network 116, and back-end components 118.

Drive-thru pickup system 100 allows any suitable number of M customers to enter a drive-thru lane associated with retail store 102 within their respective vehicles, or cars, 110.1-110.M. Boundaries of a drive-thru lane are not shown in FIG. 1 for purposes of brevity, but may include any suitable type of system for directing vehicles through a drive-thru associated with retail store 102. Each of the customers' in vehicles 110.1-110.M may also be associated with one of mobile computing devices 112.1-112.M. By determining a location of each of the mobile computing devices 112.1-112.M, therefore, drive-thru pickup system 100 may also determine a position of each of the customers in the drive-thru lane in relation to one another. As will be further discussed below, by using each customer's position in the drive-thru lane and customer information received from each of the mobile computing devices 112.1-112.M, drive-thru pickup system 100 may operate at an increased speed and efficiency compared to a traditional drive-thru pickup system.

Base station 114 may be configured to facilitate communications between one or more mobile computing devices 112.1-112.M and communication network 116 using any suitable number of wired and wireless links, such as links 115.1-115.M, for example. Although base station 114 is illustrated in FIG. 1 as wirelessly communicating with communication network 116, embodiments include base station 114 connecting to communications network 116 via any suitable number of wired and/or wireless links. For example, base station 114 may be coupled to communication network 116 via one or more landline, internet service provider (ISP) backbone connections, satellite links, a public switched telephone network (PSTN), etc. In various embodiments, base station 114 may be implemented as an access point (AP), a macrocell, a femtocell, etc.

Communication network 116 may include any suitable number of nodes, additional wired and/or wireless networks, etc., in various embodiments. For example, in an embodiment, communication network 116 may be implemented as a local area network (LAN), a metropolitan area network (MAN), a wide area network (WAN), or a suitable combination of local and/or external network connections. To provide further examples, communications network 116 may include wired telephone and cable hardware, satellite, cellular phone communication networks, etc. In various embodiments, communication network 116 may provide one or more mobile computing devices 112.1-112.M with connectivity to network services, such as Internet services and/or access to one or more back-end components 118.

Retail store 102 may be any suitable type of store that services customers using a drive-thru. For example, in various embodiments, retail store 102 may be a brick-and-mortar store such as a restaurant or a pharmacy. Retail store 102 may have an associated drive-thru window 107, which may be used to allow store staff to service customers in vehicles 110.1-110.M. For example, store staff may process payments for customers and/or pass orders to customers through drive-thru window 107. Although FIG. 1 only shows a single drive-thru window 107, it will be appreciated by those of ordinary skill in the relevant art(s) that retail store 102 may include any suitable number of drive-thru windows 107. For example, retail store 102 may have one drive-thru window for accepting payments and a second drive-thru window to pass orders to customers.

Transmitters 108.1-108.N may be implemented as any suitable wireless communication device configured to transmit one or more signals in accordance with any suitable recurring schedule, such as once per every 10 seconds, once per 30 seconds, etc. In some embodiments, transmitters 108.1-108.N may be implemented as iBeacons, which have been developed by Apple, Inc. In various embodiments, transmitters 108.1-108.N may be mounted to a surface of retail store 102 (e.g., to an exterior wall) or otherwise permanently or semi-permanently mounted at various different predetermined locations throughout the drive-thru lane. For example, as shown in FIG. 1, transmitter 108.3 is located closer to drive-thru window 107 than transmitter 108.N.

Transmitters 108.1-108.N may be configured to store any suitable number of parameters, such as unique identifiers, location identifiers, and/or store identifiers, for example, and to transmit these parameters as part of each transmitter 108's respective transmission. As will be appreciated by those of ordinary skill in the relevant art(s), transmitters 108.1-108.N may be implemented with any suitable number of power sources, wireless transmitters, receivers, and/or transceivers, processors, memories, etc., to facilitate this functionality.

In various embodiments, transmitters 108.1-108.N may be configured to store their respective parameters in any suitable memory device utilized by each respective transmitter 108, such as a flash-based memory, a battery-backed RAM, etc. In some embodiments, transmitters 108.1-108.N may be configured to transmit signals including their respective parameters in accordance with any suitable communication protocol, such as IEEE Standards, for example. Examples of suitable communication protocols may include personal area network (PAN) protocols, (e.g., BLUETOOTH), Wi-Fi, radio frequency identification (RFID) and/or a near field communication (NFC) protocols.

In some embodiments, transmitters 108.1-108.N may be configured to operate in an "advertising mode" in which transmitters 108.1-108.N only transmit and to not otherwise receive communications. In other embodiments, transmitters 108.1-108.N may be configured to transmit their respective parameters as well as receive communications from other communication devices, such as mobile computing devices 112.1-112.M, for example. Embodiments in which transmitters 108.1-108.N operate in an advertising mode may be particularly useful when they are implemented as devices that utilize a battery power source, as such a configuration advantageously reduces power consumption.

In some embodiments, the transmitted parameters may include any suitable type of identifier. For example, a portion of the transmitted parameters could correspond to a particular store location and be common among all transmitters 108.1-108.N located at a single store, while another portion of the transmitted parameters may function to uniquely identify the location and/or identity of the respective transmitter 108.

For example, transmitters 108.1-108.M may be configured to transmit, as part of its respective parameters, a universally unique identifier (UUID). Transmitters 108.1-108.N may be configured to transmit their respective UUIDs in accordance with one or more standards utilized by iBeacon devices. For example, transmitters 108.1-108.N may transmit their respective UUIDs in accordance with a BLUETOOTH Low Energy (BLE) protocol, which implements the BLUETOOTH 4.0 specification at the time of this writing.

In various embodiments, the transmitted parameters may also include data representative of calibrated receive power information. For example, iBeacons broadcast a power value that is a calibrated received signal strength indicator (RSSI) measured 1 meter from the transmitter by a mobile computing device. By broadcasting this power value, another device (e.g., mobile computing devices 112.1-112.M) may compare the RSSI of a received beacon transmission to the calibrated value sent with the beacon transmission and use this ratio to estimate its proximity to the transmitter 108 transmitting the beacon.

Mobile computing devices 112.1-112.M may be configured to communicate with one or more of transmitters 108.1-108.N and/or to receive parameters transmitted from one or more of transmitters 108.1-108.N. In addition, mobile computing devices 112.1-112.M may be configured to communicate with retail computing device 104 via one or more respective links 109.1-109.M. Furthermore, mobile computing devices 112.1-112.M may be configured to communicate with retail computing device 104 and/or back-end components 118 via base station 114 and communication network 116 using one or more respective links 115.1-115.M. As will be appreciated by those of ordinary skill in the relevant art(s), mobile computing devices 112.1-112.M may be implemented with any suitable number of power sources, wireless transmitters, receivers and/or transceivers, processors, memories, etc., to facilitate this functionality.

In an embodiment, one or more of mobile computing devices 112.1-112.M may be implemented as a user equipment (UE), such as a smartphone, for example. Although mobile computing devices 112.1-112.M are illustrated in FIG. 1 as phones, one or more of mobile computing devices 112.1-112.M may be implemented as any suitable communication device configured to communicate with transmitters 108.1-108.N and communication network 116. For example, one or more of mobile computing devices 112.1-112.M may be implemented as a smartphone, a personal digital assistant (PDA), a tablet computer, a laptop computer, a wearable electronic device, etc.

One or more of mobile computing devices 112.1-112.M may be configured to communicate using any suitable number and type of communication protocols, such as Wi-Fi, cellular, BLUETOOTH, NFC, RFID, etc. For example, one or more of mobile computing devices 112.1-112.M may be configured to communicate with base station 114 using a first communication protocol to send data to and/or receive data from back-end components 114 and/or retail computing device 104 via communication network 116 using one or more of links 115.1-115.M. To continue this example, one or more of mobile computing devices 112.1-112.M may be configured to communicate with retail computing device 104 using a second communication protocol to send data to and/or receive data from retail computing device 104 using one or more of links 109.1-109.M. In various embodiments, these first and second communication protocols may be the same type or different types of communication protocols. To provide an illustrative example, one or more of mobile computing devices 112.1-112.M may communicate with back-end components 118 via base station 114 and communication network 116 via a cellular communication protocol using links 115.1-115.M, but communicate with retail computing device 104 directly via a BLUETOOTH communication protocol using links 109.1-109.M.

One or more of mobile computing devices 112.1-112.M may be configured to execute an application installed thereon to facilitate one or more portions of the various embodiments described herein. For example, an application, which will be further discussed in detail below, may be downloaded and installed on one or more of mobile computing devices 112.1-112.M by each respective customer. The application may listen for signals transmitted by transmitters 108.1-108.M to determine whether the respective mobile computing device is within range of, and thus proximate to, one or more transmitters 108.1-108.M.

In various embodiments, one or more of mobile computing devices 112.1-112.M may be configured to detect their proximity to one or more transmitters 108.1-108.M using any suitable proximity detection method. As will be appreciated by those of ordinary skill in the relevant art(s), proximity detection may be accomplished using any suitable known ranging methods, such as those described in accordance with the iBeacon standard, techniques implementing signal attenuation measurements, signal strength measurements, the use of propagation time of arrival (ToA) and time of departure (ToD) timestamps, etc.

Upon detection of its proximity to a transmitter 108.1-108.M, the application installed on one or more of mobile computing devices 112.1-112.M may cause the respective mobile computing device to perform one or more functions. That is, once a suitable application is installed on a mobile computing device 112, the application may cause that mobile computing device 112 to listen for transmissions from one or more transmitters 108.1-108.M, to determine whether that mobile computing device 112 is proximate to one or more transmitters 108.1-108.M, to receive parameters transmitted from one or more proximate transmitters 108.1-108.N, and/or to perform one or more functions with or without user intervention. The one or more functions that may be performed by the mobile computing device 112 upon detection of its proximity to a transmitter are further discussed in detail below.

Upon receiving a signal transmitted by one or more transmitters 108.1-108.M, one or more of mobile computing devices 112.1-112.M may generate ranging data based upon the strength of the received signal, such as an RSSI value, for example. In some embodiments, this ranging data may represent the actual measured signal strength value, such as a value in dBm, for example. In other embodiments, this ranging data may represent a scaled indication of the distance between a mobile computing device 112 receiving a signal from a proximate transmitter 108.

For example, in accordance with the current iBeacon standard as of this writing, one or more of mobile computing devices 112.1-112.M may compare the RSSI value of the received signal transmitted by a proximate transmitter 108 to the calibrated power value transmitted by the proximate transmitter 108 and use this ratio to calculate ranging data, such as an immediate range (e.g., one to two inches), a near range (3 to 6 feet), and a far range (greater than 30 feet).

In accordance with an embodiment, one or more of mobile computing devices 112.1-112.M may be configured to communicate this ranging data to back-end components 118 and/or to retail computing device 104. The ranging data may be communicated, for example, as part of an application programming interface (API) services call. As will be appreciated by those of ordinary skill in the relevant art(s), the API call may be placed as part of an installed application function, which may run as background-running application. As a result, the API call may be advantageously placed without user intervention by being triggered upon mobile computing device 112 detecting its proximity to a transmitter 108.

Additionally or alternatively, one or more of mobile computing devices 112.1-112.M may be configured to send timestamp data indicative of when each of the transmissions was received from one or more transmitters 108.1-108.N. For example, one or more of mobile computing devices 112.1-112.M may log a timestamp of when a transmission was first received from one or more of transmitters 108.1-108.N and/or a timestamp associated with receiving any suitable number of subsequent transmissions. One or more of back-end components 118 and/or to retail computing device 104 may then utilize this timestamp data to calculate information such as customer dwell times and overall service times, which is further discussed in detail below.

Additionally or alternatively, one or more of mobile computing devices 112.1-112.M may be configured to communicate customer information identifying the customer associated with the ranging data to back-end components 118 and/or to retail computing device 104. This customer information may include any suitable information to identify the customer so that the customer may be later matched to her order information. For example, the customer information may include a customer's username, patient identification number, the customer's first and last name, etc.

In various embodiments, upon installing and launching the application on the customer's mobile computing device 112, the customer may be prompted to enter login information to access the customer's information from one or more back-end components 118. For example, the customer may initially create a customer profile with the retailer upon first launching the application, through a registration process via a website, over the phone, etc. This customer profile may include, for example, the customer's contact information, preferred forms of payment (e.g., credit card numbers), etc. As will be appreciated by those of ordinary skill in the relevant art(s), the customer may later access his customer profile by supplying this login information, which may include a username and password combination, for example.

In various embodiments, the customer's mobile computing device 112 may store this username and/or password data and transmit one or more portions of this data as the customer information. For example, as shown in FIG. 1, mobile computing device 112.1 may send data indicative of the customer "Alice Brown," along with her patient identification number and ranging data, to one or more back-end components 118. Upon sending the customer information to back-end components 118 and/or retail computing device 104, back-end components 118 and/or retail computing device 104 may subsequently correlate a customer's pickup order information to the customer information. For example, as will be further discussed below in more detail, the customer's pickup order information may be determined by correlating recently filled (or recently called in) prescription orders, which may also include the customer's name and/or patient ID, with the customer information.

Furthermore, back-end components 118 and/or retail computing device 104 may also associate the ranging data with the identified customer. The customer information may also be communicated, for example, as part of the same API services call used for communicating the ranging data or a separate API services call. The API call may be advantageously placed without user intervention and may be triggered upon a mobile computing device 112 detecting its proximity to a transmitter 108.

In some embodiments (e.g., peer-to-peer mode embodiments) one or more mobile devices 112.1.-112.M may communicate with one or more back-end components 118 to retrieve the customer's order information once it has been identified by one or more back-end components 118. The one or more mobile computing devices 112.1-112.M may send the customer information, the customer's order information, and/or the ranging data for each identified customer to retail computing device 104. In this way, retail computing device 104 may not communicate with one or more back-end components 118 to determine the position of each customer in the drive-thru lane and their respective pickup order information.

The one or more mobile computing devices 112.1-112.M may send the customer information, the customer's order information, and/or the ranging data for each identified customer to retail computing device 104. In this way, retail computing device 104 may not communicate with one or more back-end components 118 to determine the position of each customer in the drive-thru lane and their respective pickup order information.

In other embodiments (e.g., network communication mode embodiments) retail computing device 104 may receive the customer's order information once it has been identified by one or more back-end components 118. For example, as shown in FIG. 1 and previously discussed, mobile computing device 112.1 may send customer information regarding customer "Alice Brown," along with her patient identification number and ranging data, to one or more back-end components 118. Once one or more back-end components 118 correlates this information to stored data and retrieves Alice's pickup order details, one or more back-end components may send this information to retail computing device 104.

Back-end components 118 may include any suitable number of components configured to receive data from and send data to one or more of mobile computing devices 112.1-112.M and/or retail computing device 104 via communication network 116 using any suitable number of wired and/or wireless links. In various embodiments, back-end components 118 may be configured to execute one or more applications to facilitate one or more embodiments as discussed herein. Back-end components 118 may include one or more external computing devices such as servers 120, databases 122, and/or database servers 124. Although FIG. 1 illustrates back-end components 118 as including only three different types of back-end components, those of ordinary skill in the relevant art(s) will appreciate that back-end components 118 may include any suitable number and type of back-end components to facilitate the appropriate functions of the embodiments as described herein.

For example, database server 124 may be implemented as any suitable number of servers that are configured to access data from database 122, which may store any suitable type of data as is further discussed in detail below. To provide another example, server 120 may be implemented as any suitable number of web servers configured to provide Internet communications to one or more of mobile computing devices 112.1-112.M, to process API service calls, and/or to support one or more applications installed on one or more of mobile computing devices 112.1-112.M. As will be appreciated by those of ordinary skill in the relevant art(s), back end components 118 may store and/or access secure data that is of a private, proprietary, and/or sensitive nature. As a result, various embodiments of back end components 118, communication network 116, retail computing device 104, and/or one or more of mobile computing devices 112.1-112.M may implement appropriate security protocols such as encryption, secure links, network authentication, firewalls, etc., to appropriately protect such secure data.

Database 122 may be configured to store any suitable relevant data as described in the embodiments presented herein related to the operation of drive-thru pickup system 100. Such data may include, for example, a customer profile that includes customer information, payment information, prescription information, etc. To provide additional examples, data stored in database 122 may include stock and/or inventory information, stock keeping units (SKUs), price information, store information such as store locations, store numbers, etc. One or more of back-end components 118 may communicate with database 122 to store data to and/or read data from database 122 as needed to facilitate the appropriate functions of the embodiments as described herein.

Again, the customer profile may include data that was initially entered by a customer. Additionally, the customer profile may also include data that was later added to the customer profile. For example, a customer may initially create a portion of a customer profile and, once created, additional data may be later added to the customer profile such as prescription information, coupons, promotions, etc.

The prescription information may include the type of prescription, the prescription dosage, prescription classification, whether the prescription is a narcotic, a controlled substance, or a drug that is otherwise subject to enhanced control due to its potential abuse. In some cases, laws may only allow a person to pick up their own prescription, and/or may require the customer to present photo identification. In such a case, the customer profile may include additional flags or information indicative of this.

The prescription information may include previously filled prescriptions called in by the customer's doctor and/or recently called in and unfilled prescriptions, which may be entered by pharmacy staff, for example. For example, upon a doctor calling in a prescription to the pharmacy, staff may update the customer profile to include prescription information such as prescription product, dosage, type, etc. In some embodiments, the prescription information may be added to the customer information profile stored in one or more back-end components 118 by pharmacy staff via retail computing device 104. In other embodiments, the prescription information may be stored in retail computing device 104.

In some embodiments, the customer may be picking up a prescribed pharmaceutical product refill. In such a case, the prescription information may include relevant information such as the number of available refills, an expiration of the number of refills, etc.

In other embodiments, the customer may additionally or alternatively be picking up a prescribed pharmaceutical product which is not a refill, including, for example, an initial supply of a prescribed pharmaceutical product which the customer has not used before. In such a case, the customer profile may include relevant information such as the customer's insurance information or other useful information to relay to the customer, such as side effects, instructions on how often to take the medication, allergy information, etc.

In embodiments in which the customer profile includes payment information, the customer may elect to register a default payment method, (e.g., a debit or credit card) so payments can be processed using the customer's stored payment information. For example, to make the drive-thru prescription pickup and payment process more convenient for the customer, a customer may register their identification, insurance information, and/or other applicable information with his customer profile so this information does not need to be initially provided in the drive-thru lane (but may simply be verified) when the customer picks up the prescription at the drive-thru window. In such embodiments, payments may be processed before the customer picks up the prescription while waiting in the drive-thru lane, at the drive-thru window, etc.

Retail computing device 104 may be configured to communicate with back-end components 118 and/or with one or more of mobile computing devices 112.1-112.M via any suitable number of wired and/or wireless links to send data to and/or receive data from with back-end components 118 and/or one or more of mobile computing devices 112.1-112.M. Again, retail computing device 104 may communicate with one or more of mobile computing devices 112.1-112.M directly via links 109.1-109.M using a first communication protocol (e.g., BLUETOOTH) and with back-end components 118 using a second communication protocol (e.g., a Transmission Control Protocol (TCP) and Internet Protocol (IP)), which may be different than or the same as the second communication protocol.

In an embodiment, retail computing device 104 may be implemented as a specialized and/or proprietary user equipment (UE), such as a pharmacy terminal computer, for example. Although retail computing device 104 is illustrated in FIG. 1 as a terminal computer system, retail computing device 104 may be implemented as any suitable computing device configured to communicate with one or more mobile computing devices 112.1-112.M and/or back-end components 118. For example, retail computing device 104 may be implemented as a smartphone, a personal digital assistant (PDA), a tablet computer, a laptop computer, a wearable electronic device, etc.

In some embodiments, retail computing device 104 may be configured to operate in a standalone mode without having to communicate with back-end components 118. In accordance with such embodiments, retail computing device 104 may receive customer information, ranging data, and/or customer prescription pickup order information from one or more mobile computing devices 112.1-112.M and to display a relative position of each customer in the drive-thru lane and their prescription pickup order using this information. Additionally or alternatively, retail computing device 104 may locally store the customer prescription pickup order information and may not receive this information from one or more mobile computing devices 112.1-112.M.

In standalone embodiments, retail computing device 104 may communicate in a peer-to-peer mode with one or more mobile computing devices 112.1-112.M (e.g., via links 109.1-109.M) in accordance with such embodiments so that a common back-end application is not needed. In peer-to-peer mode embodiments, retail computing device may have a locally stored list of unfilled prescriptions and/or recently filled prescriptions from called in prescription orders. Retail computing device 104 may receive customer information and ranging data from one or more of mobile computing devices 112.1-112.M. The ranging data may be used to determine a position of the customer's mobile computing device 112, while the customer information may be used to associate the customer with one of the locally stored prescription orders. Retail computing device 104 may display this information on a suitable display such that each customer's position in line and his associated prescription information are displayed.

In other embodiments, retail computing device 104 may communicate in a network communications mode to utilize a back-end application by communicating with one or more of back-end components 118 via communication network 116. In accordance with such embodiments, retail computing device 104 may access the prescription information stored in one or more of back-end components 118, which may include the name of the prescription customer. Additionally or alternatively, retail computing device 104 may access portions of the customer's profile from back-end components 118, such as customer contact information, payment information, etc. Retail computing device 104 may communicate with one or more back-end components 104 to retrieve a list of unfilled prescriptions and/or recently filled prescriptions from called in prescription orders. Retail computing device 104 may receive customer information and ranging data stored in one or more back-end components 118 sent from one or more of mobile computing devices 112.1-112.M. Again, the ranging data may be used to determine a position of the customer's mobile computing device 112, while the customer information may be used to associate the customer with one of the locally stored prescription orders. Retail computing device 104 may display this information on a suitable display such that each customer's position in line and his associated prescription pickup order information are displayed.

In network communications mode embodiments, retail computing device 104 may utilize a back-end application to advantageously access additional information that may be stored in one or more of back-end components 118 to offload processing, to process payments, etc. In embodiments in which payments are processed in such a manner, the customers may not need to pay for their prescriptions at drive-thru window 107, further increasing the speed and efficiency of drive-thru pickup system 100.

In both peer-to-peer mode and network communications mode embodiments, back-end components 118 and/or to retail computing device 104 may continuously retrieve ranging data and/or customer information to update the position of customer vehicles as new customers enter the drive-thru lane and as serviced customers exit the drive-thru lane. As will be appreciated by those of ordinary skill in the relevant art(s), the ranging data and/or customer information may be polled at any suitable time interval to provide an appropriate level of feedback to retail store employees utilizing retail computing device 104.

Furthermore, back-end components 118 and/or to retail computing device 104 may be configured to calculate dwell times and/or service times based upon the timestamp data reported by one or more of mobile computing devices 112.1-112.M. For example, by referencing the ranging data with the timestamp data, a determination may be made regarding how long a customer was at the same position in the drive-thru lane. To provide an illustrative example, if mobile computing device 112.1 sends ranging data that does not change more than a threshold value (e.g., 3 dBm, 5 dBm, etc.) that is timestamped every 10 seconds, then the cumulative time in which the ranging data did not change by the threshold amount may be considered a dwell time that vehicle 110.1 was stationary in the drive-thru lane.

In addition, back-end components 118 and/or retail computing device 104 may be configured to calculate overall service times using the initially reported timestamp sent from one or more of mobile computing devices 112.1-112.M, which may correspond to the earliest recorded time that the customer entered the drive-thru lane. By using another time reference, such as a timestamp associated with when the customer's payment was processed, for example, an overall customer service time may be calculated. As will be appreciated by those of ordinary skill in the relevant art(s), the dwell time and service time data may be used to reveal valuable information regarding the speed and efficiency of a particular drive-thru system.

Figure 2:
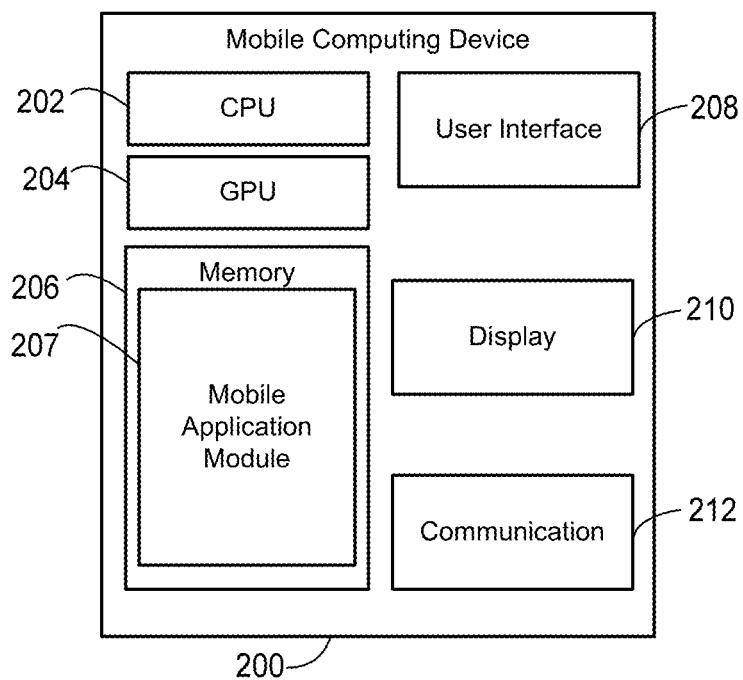
FIG. 2 is a block diagram of an exemplary mobile computing device 200, according to an embodiment.

FIG. 2 is a block diagram of an exemplary mobile computing device 200, according to an embodiment. In an embodiment, mobile computing device 200 may be an implementation of any of mobile computing devices 112.1-112.M, for example, as shown in FIG. 1. In an embodiment, mobile computing device 200 is implemented as a user equipment (UE), such as a mobile computing device, a smartphone, a laptop computer, tablet computer, desktop computer, or any other suitable type of computing device. Mobile computing device 200 may include a central processing unit (CPU) 202, a graphics processing unit (GPU) 204, a memory 206, a user interface 208, a display 210, and a communication unit 212.

CPU 202 and/or GPU 204 may be configured to communicate with memory 206 to store to and read data from memory 206. In accordance with various embodiments, memory 206 may be a computer-readable non-transitory storage device that may include any combination of volatile (e.g., a random access memory (RAM), or non-volatile memory (e.g., battery-backed RAM, FLASH, etc.). Memory 206 may be configured to store instructions executable on CPU 202 and/or GPU 204. These instructions may include machine readable instructions that, when executed by CPU 204 and/or GPU 204, cause CPU 202 and/or GPU 204 to perform various acts. Memory 206 may also be configured to store any other suitable data, such as customer information, ranging data, timestamp information, etc.

In various embodiments, CPU 202 and/or GPU 204 may be configured to determine a current time from a real-time clock circuit and/or by receiving a network time via communication unit 212 (e.g., via base station 114). Furthermore, various embodiments include CPU 202 and/or GPU 204 maintaining a running clock and/or a timer. In various embodiments, CPU 202 and/or GPU 204 may reference this running clock and/or timer to generate timestamps and to store generated timestamps in a suitable portion of memory 206. For example, CPU 202 and/or GPU 204 may generate a timestamp when a signal transmission is received from one or more transmitters (e.g., transmitters 108.1-108.M), which may in turn be transmitted by communication unit 212 with customer information and/or ranging data.

Mobile application module 207 is a portion of memory 206 configured to store instructions, that when executed by CPU 202 and/or GPU 204, cause CPU 202 and/or GPU 204 to perform various acts in accordance with applicable embodiments as described herein. For example, in various embodiments, instructions stored in mobile application module 207 may facilitate CPU 204 and/or GPU 204 to perform functions such as, for example, listening for transmissions from one or more transmitters (e.g., transmitters 108.1-108.M), determining whether mobile computing device 200 is proximate to one or more transmitters, receiving one or more parameters transmitted from one or more transmitters, generating timestamps associated with when a transmitter is located proximate to mobile computing device 200 and/or when transmitted parameters are received, measuring the signal strength of transmitter transmissions, to generate ranging data, transmitting the ranging data and/or customer information stored in memory 206 to another device via communication unit 212 (e.g., to retail computing device 104 and/or one or more back-end components 118), displaying one or more interactive icons via display 210, receiving user input via user interface 208, communicating with external computing devices (e.g., retail computing device 104 and/or one or more back-end components 118), etc.

As will be appreciated by those of ordinary skill in the relevant art(s), CPU 202 and/or GPU 204 may access instructions stored in application module 209 to implement any suitable number of routines, algorithms, applications, programs, etc., to facilitate the functionality as described herein with respect to the applicable embodiments.

In some embodiments, the information and/or instructions stored in application module 207 may be setup upon the initial installation of a corresponding application. In such embodiments, the application may be installed in addition to an operating system implemented by mobile computing device 200. For example, a user may download and install the application from an application store via communication unit 212 in conjunction with user interface 208. Application stores may include, for example, Apple Inc.'s App Store, Google Inc.'s Google Play, Microsoft Inc.'s Windows Phone Store, etc., depending on the operating system implemented by mobile computing device 200.

In other embodiments, the information and/or instructions stored in application module 207 may be integrated as a part of the operating system implemented by mobile computing device 200. For example, a user could setup the application via an initial setup procedure upon initialization of mobile computing device 200, as part of setting up a new user account on mobile computing device 200, etc.

Upon execution of application module 207, CPU 202 and/or GPU 204 may run one or more foreground and/or background processes. For example, application module 207 may cause GPU 204 to display a corresponding interactive icon on display 210. A user may launch, or execute, the application associated with application module 207 by performing an appropriate gesture, such as tapping his finger on an interactive portion of display 210 to open the application. Upon launching the application in this way, a user may enter her login credentials to be connected to one or more back-end components 118 and view and/or edit details associated with her customer profile, which may optionally be stored in any suitable portion of memory 206.

Once the user has entered her login credentials, the application may execute one or more background processes. For example, mobile computing device 200 may actively listen for transmissions without user intervention in accordance with a certain communication protocol, as indicated by the instructions in application module 207. Furthermore, the application may execute a background running process and, without user intervention, cause mobile computing device 200 to determine whether mobile computing device 200 is proximate to one or more transmitters, to receive one or more parameters transmitted from one or more transmitters, to generate timestamps associated with when a transmitter is located proximate to mobile computing device 200 and/or when transmitted parameters are received, to measure the signal strength of transmitter signal transmissions, to generate ranging data, to transmit the ranging data and/or customer information stored in memory 206 to another device via communication unit 212 (e.g., to retail computing device 104 and/or one or more back-end components 118), to cause payments to be processed using payment information associated with the customer's profile, etc.

User interface 208 may be configured to facilitate user interaction with mobile computing device 200. For example, user interface 210 may include a user-input device such as an interactive portion of display 212 (e.g., a "soft" keyboard displayed on display 212), an external hardware keyboard configured to communicate with mobile computing device 200 via a wired or a wireless connection (e.g., a BLUETOOTH keyboard), an external mouse, or any other suitable user-input device.

Display 210 may be implemented as any suitable type of display that may facilitate user interaction, such as a capacitive touch screen display, a resistive touch screen display, etc. In various aspects, display 210 may be configured to work in conjunction with user-interface 208, CPU 202, and/or GPU 204 to detect user inputs upon a user selecting a displayed interactive icon or other graphic, to identify user selections of objects displayed via display 210, etc.

Communication unit 212 may be configured to facilitate communications between mobile computing device 200 and one or more external computing devices, such as one or more of back-end components 118 and/or retail computing device 104, for example, as shown in FIG. 1. As will be appreciated by those of ordinary skill in the relevant art(s), communication unit 212 may be implemented with any combination of suitable hardware and/or software to enable these functions. For example, communication unit 212 may be implemented with any number of wired and/or wireless transceivers, antennas, network interfaces, physical layers (PHY), etc. Communication unit 212 may facilitate communications between mobile computing device 200 and one or more networks, such as communications network 116, for example, as shown in FIG. 1. Communication unit 212 may be configured to utilize any suitable number and type of communication protocols. Examples of suitable communication protocols may include, for example, cellular communication protocols, Wi-Fi communication protocols, BLUETOOTH communication protocols, NFC communication protocols, RFID communication protocols, etc.

Mobile computing device 200 may communicate in accordance with any suitable number and type of communication modes, and may be configured to communicate in these different types of communication modes at the same time. For example, mobile computing device 200 may communicate in a peer-to-peer mode and a network communication mode at the same time, or at separate times. To provide an illustrative example, mobile computing device 200 may communicate with an external computing device directly in a peer-to-peer mode (e.g., retail computing device 104) and communicate with one or more back-end components (e.g., back-end components 118) in a network communication mode (e.g. via base station 114 and communication network 116)

In various embodiments, communication unit 212 may be configured to measure the strength of signals transmitted by one or more transmitters 108.1-108.M and to provide these measurements to CPU 202. In this way, communication unit 212 may facilitate CPU 202 generating ranging data.

Although each of the components in FIG. 2 are illustrated as separate units or modules, those of ordinary skill in the relevant art(s) will appreciate that any components integrated as part of mobile computing device 200 shown in FIG. 2 may be combined and/or share functionalities. For example, CPU 202, GPU 204, and memory 206 may be integrated as a single processing unit. Furthermore, although connections are not shown between the individual components of mobile computing device 200, those of ordinary skill in the relevant art(s) will appreciate that mobile computing device 200 may implement any suitable number of wired and/or wireless links to facilitate communication and interoperability between these components. For example, memory 206, communication unit 212, and/or display 210 may be coupled via wired buses and/or wireless links to CPU 202 and/or GPU 204 to facilitate communications between these components and to enable these components to accomplish their respective functions as described throughout the present disclosure. Furthermore, although FIG. 2 illustrates a single memory 206, those of ordinary skill in the relevant art(s) will appreciate that mobile computing device 200 may implement any suitable number and/or combination of memory systems.

Figure 3:
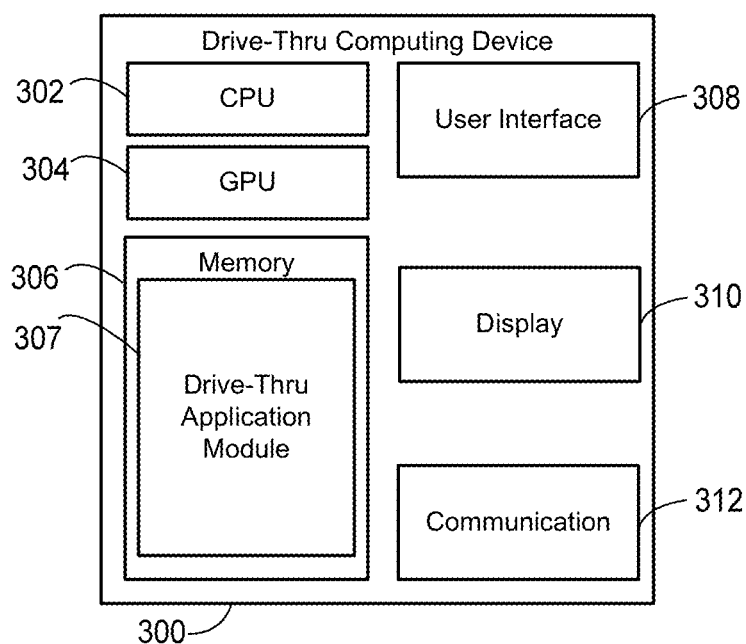
FIG. 3 is a block diagram of an exemplary drive-thru computing device 300, according to an embodiment.

FIG. 3 is a block diagram of an exemplary drive-thru computing device 300, according to an embodiment. In an embodiment, drive-thru computing device 300 may be an implementation of retail computing device 104, for example, as shown in FIG. 1. In an embodiment, drive-thru computing device 300 may be implemented as a user equipment (UE), such as a mobile computing device, a smartphone, a laptop computer, a tablet computer, a desktop computer, or any other suitable type of computing device. Drive-thru computing device 300 may include a CPU 302, a GPU 304, a memory 306, a user interface 308, a display 310, and a communication unit 312.

CPU 302, GPU 304, memory 306, user interface 308, display 310, and communication unit 312 may be substantially similar implementations of, and perform substantially similar functions as, CPU 202, GPU 204, memory 206, user interface 208, display 210, and communication unit 212, respectively, as shown in FIG. 2. Therefore, only differences between CPU 302, GPU 304, memory 306, user interface 308, display 310, communication unit 312, and CPU 202, GPU 204, memory 206, user interface 208, display 210, and communication unit 212, respectively, will be further discussed herein.

Drive-thru application module 307 is a portion of memory 306 configured to store instructions, that when executed by CPU 302 and/or GPU 304, cause CPU 302 and/or GPU 304 to perform various acts in accordance with applicable embodiments as described herein. For example, in various embodiments, instructions stored in drive-thru application module 307 may facilitate CPU 304 and/or GPU 304 to perform functions such as, for example, receiving customer information, customer pickup order information, ranging data, and/or timestamps from one or more other computing devices via communication unit 314. For example, in some embodiments, the customer information, customer pickup order information, ranging data, and/or timestamps may be received via communication unit 312 directly from one or more of mobile computing devices 112.1-112.M, as shown in FIG. 1. To provide another example, in other embodiments, the customer information, customer pickup order information, ranging data, and/or timestamps may be transmitted from one or more of mobile computing devices 112.1-112.M, as shown in FIG. 1, to one or more back-end components 118 and received via communication unit 312 via communication network 116.

As will be appreciated by those of ordinary skill in the relevant art(s), CPU 302 and/or GPU 04 may access instructions stored in drive-thru application module 307 to implement any suitable number of routines, algorithms, applications, programs, etc., to facilitate the functionality as described herein with respect to the applicable embodiments.

To provide yet another example, in still other embodiments, any suitable combination of the customer information, customer pickup order information, ranging data, and/or timestamps may be transmitted from one or more of mobile computing devices 112.1-112.M and/or stored in one or more back-end components 118, as shown in FIG. 1. In such a case, drive-thru application module 307 may facilitate CPU 304 and/or GPU 304 receiving, via communication unit 312, customer information, customer pickup order information, ranging data, and/or timestamps via any suitable combination of direct communications between (i) drive-thru computing device 300 and one or more mobile computing devices 112.1-112.M and/or (ii) network communications between drive-thru computing device 300, one or more back-end components 118, and/or one or more mobile computing devices 112.1-112.M.

In some embodiments, the information and/or instructions stored in drive-thru application module 307 may be setup upon the initial installation of a corresponding application. In such embodiments, the application may be installed in addition to an operating system implemented by drive-thru computing device 300. For example, a user may download and install the application from an application store via communication unit 312 in conjunction with user interface 308. Application stores could include, for example, Apple Inc.'s App Store, Google Inc.'s Google Play, Microsoft Inc.'s Windows Phone Store, etc., depending on the operating system implemented by drive-thru computing device 300.

In other embodiments, the information and/or instructions stored in drive-thru application module 307 may be integrated as a part of the operating system implemented by drive-thru computing device 300. For example, a user could setup the application via an initial setup procedure upon initialization of drive-thru computing device 300, as part of setting up a new user account on drive-thru computing device 300, etc.

In various embodiments, drive-thru computing device 300 may determine each customer's position in line from ranging data transmitted from each of the customer's respective mobile computing device (e.g., mobile computing devices 112.1-112.M). That is, upon execution of drive-thru application module 307, CPU 302 and/or GPU 304 may associate the customer information and ranging data sent from each customer's mobile computing device (e.g., mobile computing device 112) to determine a position of each customer in the drive-thru lane. For example, referring back to FIG. 1, ranging data sent by mobile computing device 112.1 and 112.2 may indicate a greater range between mobile computing device 112.1 and transmitter 108.3 than between mobile computing device 112.2 and transmitter 108.3. Because drive-thru computing device 300 may also receive customer information from each of mobile computing devices 112.1 and 112.2, CPU 302 and/or GPU 304 may determine that the customer in vehicle 110.3 is ahead of the customer in vehicle 110.1 in the drive-thru lane and display an appropriate indication on display 310.

In some embodiments, drive-thru computing device 300 may calculate these positions locally from the ranging data. In other embodiments, one or more back-end components (e.g., back-end components 118) may calculate the position of each customer and send this position data to drive-thru computing device 300. In this way, drive-thru computing device 300 may offload the position calculations to the one or more back-end components. The term "ranging data," as used herein may therefore encompass any information suitable for identifying the position of each customer within the drive-thru lane, such as signal strength data (e.g., RSSI values), scaled range information (e.g., near, intermediate, far, etc.) and/or the actual positions calculated from one or more of the signal strength data and/or scaled range information.

In addition, upon execution of drive-thru application module 307, CPU 302 and/or GPU 304 may match the customer information to one or more customer prescription pickup orders. For example, CPU 302 and/or GPU 304 may compare any portion of the customer information sent from the customer's mobile computing device to computing device 300, such as the customer's name, patient ID, etc., to the customer's prescription information associated with recently filled (or recently called in) prescription orders, which may also include the customer's name and/or patient ID.

Continuing to use FIG. 1 as an example, in some (e.g., network communication mode) embodiments, drive-thru application module 307 may cause CPU 302 and/or GPU 304 to communicate with one or more back-end components 118 to retrieve the customer's prescription information by correlating the received customer information to customer information stored with the customer's prescription information in one or more back-end components 118.

However, in other (e.g., peer-to-peer mode) embodiments, drive-thru application module 307 may cause CPU 302 and/or GPU 304 to communicate with one or more mobile computing devices 112.1-112.M to retrieve the customer's prescription information, which may be sent from the one or more mobile computing devices 112.1-112.M after being retrieved by the one or more mobile computing devices 112.1-112.M from one or more back-end components 118.

Upon execution of drive-thru application module 307, CPU 302 and/or GPU 304 may determine additional drive-thru service time metrics, such as dwell times and total service times, as previously discussed with reference to FIG. 1. As will be appreciated by those of ordinary skill in the relevant art(s), dwell time and/or service time calculations may be stored locally in any suitable portion of memory 306 and/or may be sent to and stored in one or more back-end components 118.

Storing the dwell time and/or service time calculations in one or more back-end components 118 may advantageously allow several retail drive-thru locations implementing the drive-thru system as described herein to utilize one or more back-end components 118 as a repository for these calculations. In this way, one or more back-end components 118 may store an aggregation of dwell time and/or service time calculations across several stores. In accordance with such embodiments, CPU 302 and/or GPU 304 may be configured to label the dwell time and/or service time calculations with a suitable identifier of the drive-thru service location, such as a store number, for example, upon being stored in one or more back-end components 118. As a result, the appropriate personnel may compare the performance of several retail drive-thru locations by their respective identifiers.

Furthermore, CPU 302 and/or GPU 304 may be configured to perform additional analytics on the dwell time and/or service time calculations. For example, the dwell time and/or service time calculations may be sorted into respective time-of-day and/or day-of-week time slots according to one or more timestamps. The time-of-day and/or day-of-week time slots may be grouped according to, for example, timestamps indicating when each customer's prescription pickup order was processed, when each customer's respective mobile computing device initially detected a signal transmission indicating its proximity to a transmitter, etc.

For example, the dwell time and/or service time calculations may be grouped according to a 4 hour slot of service time each individual day, for a total of 42 unique time slots for each week. To provide another example, the dwell time and/or service time calculations may be grouped according to a 4-hour slot of service time Monday through Friday and a separate 4-hour slot of service time on weekends, thereby grouping the dwell time and/or service time calculations into 6 unique weekday time slots and 6 unique weekend time slots. As will be appreciated by those of ordinary skill in the relevant art(s), any suitable grouping and granularity of time slots may be used based upon a location of the drive-thru, peak service times, etc.

Using the time-slot grouped dwell time and/or service time calculations, an average service time may be determined on a per-store and per-time slot basis. For example, service times may be collected from multiple customers that were serviced in the same time slot at the same retail store drive-thru location and averaged. For example, a first set of dwell time and/or service time calculations may be averaged over all customers serviced between 8 AM to noon Wednesday-Friday, while a second set of dwell time and/or service time calculations may be averaged over all customers serviced between 8 AM and noon Saturday and Sunday.

In some embodiments, CPU 302 and/or GPU 304 (or one or more back-end components, such as, e.g., back-end components 118) may use these average service times to predict a new customer's overall service time by first estimating which time slot a new customer will fall into upon arriving at the drive-thru location. Then, CPU 302 and/or GPU 304 (or one or more back-end components, such as, e.g., back-end components 118) may correlate that time slot to its respective average service time. In various embodiments, this estimate may be provided to the customer via her respective mobile computing device in accordance with a function of the respective application installed thereon.

FIG. 4A is a block diagram of an exemplary set of ranging data 400 used to determine customer locations within a drive thru lane using a single transmitter, according to an embodiment. FIG. 4A illustrates a tabular view of a sample of customer information and ranging data that may be received at drive-thru computing device 300. Again, the customer information and ranging data shown in FIG. 4A may be received at drive-thru computing device 300 directly (peer-to-peer mode) or indirectly (network communication mode) from one or more mobile computing devices, such as mobile computing devices 112.1-112.M, for example, as shown in FIG. 1.

The data shown in FIGS. 4A-B may be updated over several subsequent time intervals as additional ranging data is received for the same set of customers. Furthermore, additional customers may enter the drive-thru lane and their respective mobile computing devices may subsequently report additional customer information and ranging data that is not shown in FIG. 4A. For purposes of brevity, the customer information and ranging data shown in FIGS. 4A-B is representative of data received within a single time interval.

As shown in FIG. 4A, each customer's respective identification number is shown along with the respective ranging data sent from each customer's respective mobile computing device. The ranging data shown in FIG. 4A may be an example of ranging data transmitted by a set of mobile computing devices corresponding to vehicles 110.1-110.3, as shown in FIG. 1, over a single time interval.

Because each transmitter is associated with a known, or predetermined, location with respect to the front of the drive-thru lane, drive-thru computing device 300 may sort the customer's position in order of decreasing ranging data to determine a position of each customer with respect to one another. In the example shown in FIG. 4A, the closest transmitter as shown in FIG. 1 is transmitter 108.3, so the closest customer is the customer associated with the ranging data having the highest value, or the customer in car 110.3, followed by the customer in car 110.2, and then the customer in car 110.1.

FIG. 4B is a block diagram of an exemplary set of ranging data 450 used to determine customer locations within a drive thru lane using multiple transmitters, according to an embodiment. As shown in FIG. 4B, drive-thru computing device 300 may receive ranging data from one or more mobile computing devices within range of more than one transmitter at the same time. Because each mobile computing device may be configured to send a unique transmitter identifier with the ranging data, drive-thru computing device 300 may additionally sort received ranging data on a per-mobile computing device and a per-transmitter basis.

As shown in FIG. 4B, each of the customer's respective mobile computing device sends ranging data for each of transmitters 108.1, 108.2, and 108.3. As will be appreciated by those of ordinary skill in the relevant art(s), signals transmitted by one or more transmitters 108 may be subject to interference, multi-path distortion, lack of line-of sight, etc., that may impact the accuracy of the ranging data. As a result, in some embodiments, drive-thru computing device 300 may determine a position of each customer in the drive-thru lane by comparing the received ranging data with respect to more than one transmitter.

Again, because each transmitter is associated with a known, or predetermined, location with respect to the front of the drive-thru lane, drive-thru computing device 300 may sort the customer's in order of decreasing ranging data to determine a position of each customer with respect to one another. In the example shown in FIG. 4B, although the closest transmitter is transmitter 108.3, the ranging data associated with each customer's mobile computing device in vehicles 110.1 and 110.2 are within 2 dBm of one another. Because other factors may account for such a difference in ranging data, using only the ranging data for transmitter 108.3 may not provide an accurate location of the position of each of the customers in vehicles 110.1, 110.2, and 110.3 within the drive-thru lane.

Therefore, drive-thru computing device 300 may utilize ranging data from additional transmitters, such as transmitters 108.2 and 108.3, for example, to determine that the customer's mobile computing device in vehicle 110.2 is closer to transmitter 108.2 than the customer's mobile computing device in vehicle 110.1. As a result, drive-thru computing device 300 may accurately sort the positions of each of the customers in the drive-thru line. As will be appreciated by those of ordinary skill in the relevant art(s), drive-thru computing device 300 may utilize any suitable technique to interpret the ranging data from multiple transmitters to calculate a position of each mobile computing device, and therefore each customer, in the drive thru lane.

FIG. 5 illustrates an exemplary drive-thru computing device screen 500, according to an embodiment. Screen 500 may include portions 502 and M number of portions 804.1-804.M. Screen 500 corresponds to an example of a screen displayed on display 310 of drive-thru computing device 300 using the exemplary information provided in drive-thru pickup system 100, as shown in FIG. 1.

Portion 502 may include any suitable graphic, information, label, etc., to provide general information such as the name of the application, the name of the retailer, a store name, a store number, a current time of day, etc. As will be appreciated by those of ordinary skill in the relevant art(s), portion 502 may include any suitable type of information based upon a particular implementation of the application executed by drive-thru computing device 300. For example, although not shown in FIG. 5 for purposes of brevity, portion 502 may include information such as current dwell times for one or more customers, average dwell times for a particular period of time, average service times for a particular period of time, etc.

Portions 504.1-504.M may include any suitable graphic, information, label, etc., to provide customer information, each customer's prescription pickup order information, and/or the position of each customer in the drive-thru lane. As will be appreciated by those of ordinary skill in the relevant art(s), portion 502 may include different types of information based upon a particular implementation of the application executed by drive-thru computing device 300. For example, if drive-thru computing device 300 is implemented in a restaurant drive-thru, the prescription information displayed in each of the portions 504.1-504.M may be replaced with food and/or drink order information.

As shown in FIG. 5, each of portions 504.1-504.M may include customer information such as the customer's name, patient identification number, address, phone number, etc. Again, this information may be retrieved from drive-thru computing device 300 in a number of ways, such as by receiving this information from each of the customer's respective mobile computing device (e.g., mobile computing devices 112.1-112.M), from one or more back-end components (e.g., back-end components 118), retrieving data that has been entered by pharmacy staff and stored locally on drive-thru computing device 300, etc.

Furthermore, each of portions 504.1-504.M may include a graphical representation and/or a text description of each customer's position in the drive-thru lane. For example, as shown in FIG. 5, each of portions 504.1-504.3 is displayed on screen 500 in the same position as each respective customer, with the top portion 504.1 being the closest customer to the drive-thru window, followed by the customer in portion 504.2, etc. Furthermore, each of portions 504.1-504.3 includes a text description of each respective customer's position, i.e., "position 1," "position 2," etc.

In addition, each of portions 504.1-504.M may include an indication of each customer's respective prescription pickup order information, such as the number of prescriptions, the name of each prescription drug, the dosage of each prescription drug, the type of each prescription drug, etc. Again, based upon the types of prescription drug, the prescription information may include a notification to pharmacy staff, such as the indication that identification is needed from the customer for the customer John Smith, as shown in portion 504.2. As will be appreciated by those of ordinary skill in the relevant art(s), any suitable type of notification may be displayed in one or more of portions 504.1-504.M, such as instructions or other information for pharmacy staff to relay to the customer, whether the prescription drug should be taken with food, etc. Furthermore, because customer's are driving when picking up their prescriptions, a notification to prescription staff to inform customers not to take some prescription drugs until they are no longer driving, when applicable, may be of particular importance.

Figure 6:
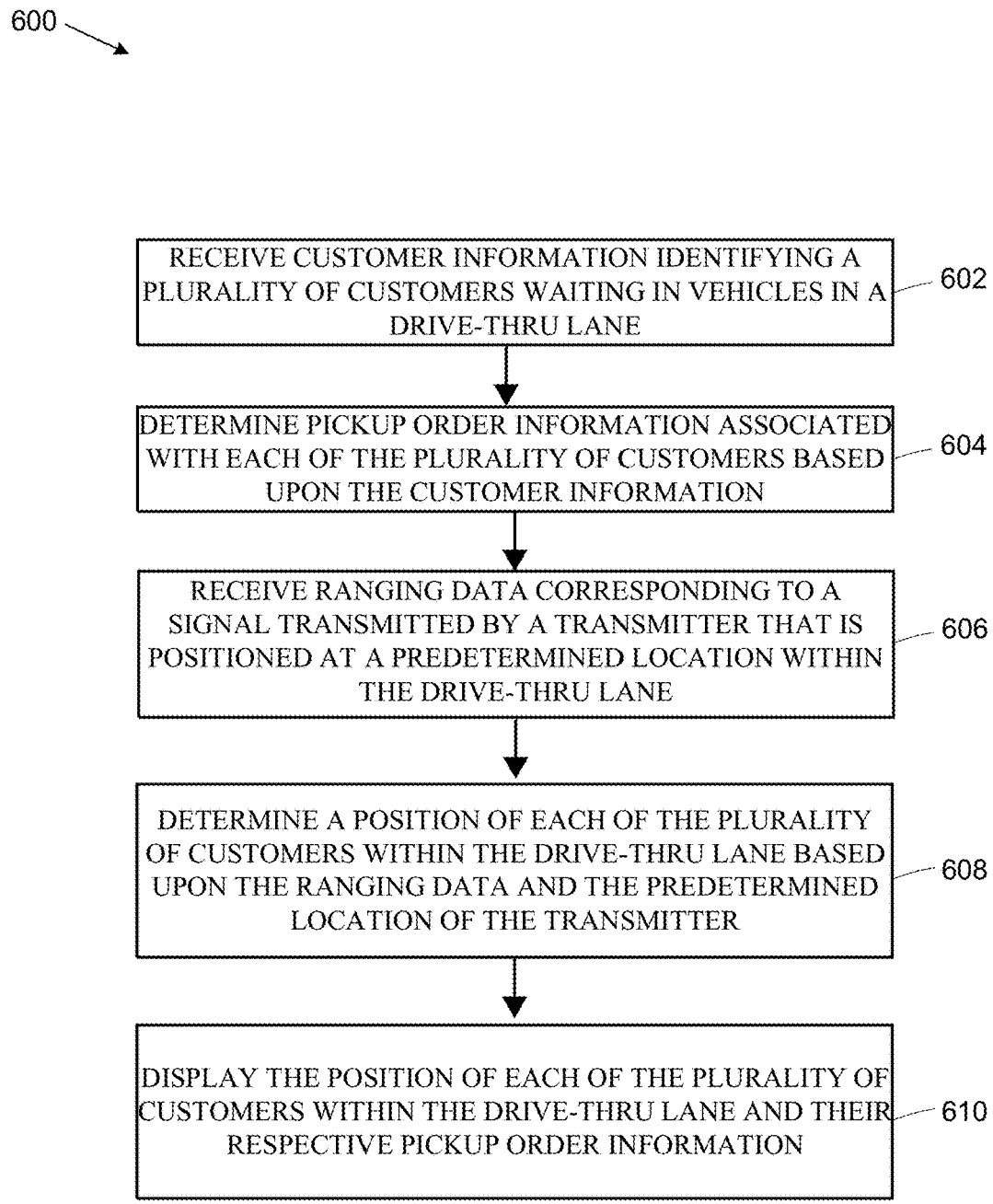
FIG. 6 illustrates a method flow 600, according to an embodiment.

FIG. 6 illustrates a method flow 600, according to an embodiment. In an embodiment, one or more portions of method 600 (or the entire method 600) may be implemented by any suitable device, and one or more portions of method 600 may be performed by more than one suitable device in combination with one another. For example, one or more portions of method 600 may be performed by drive-thru computing device 300, as shown in FIG. 3. To provide another example one or more portions of method 600 may be performed by one or more back-end components 118, as shown in FIG. 1. In an embodiment, method 600 may be performed by any suitable combination of one or more processors, applications, algorithms, and/or routines, such as CPU 302 and/or GPU 304 executing instructions stored in memory drive-thru application module 307 in conjunction with user input received via user interface 308, for example.

Method 600 may start when one or more processors receive customer information identifying a plurality of customers waiting in vehicles within a drive-thru lane (block 602). The customer information may be sent from one or more respective mobile computing devices associated with each of the plurality of customers, such as one or more mobile computing devices 112.1-112.M, for example, as shown in FIG. 1. The customer information may include, for example, the customer's name, patient ID, contact information, etc.

The one or more processors receiving the customer information may include, for example, one or more portions of drive-thru computing device 300, such as CPU 302 working in conjunction with communication unit 312, for example, to receive the customer information directly from one or more mobile computing devices or via a suitable communication network, such as communication network 116, for example, as shown in FIG. 1 (block 602).

To provide another example, one or more processors receiving the customer information may include any suitable portion of one or more back-end components, such as one or more back-end components 118, for example, receiving the customer information from one or more mobile computing devices via a suitable communication network, such as communication network 116, for example, as shown in FIG. 1, (block 602).

Method 600 may include one or more processors determining customer pickup order information associated with each of the plurality of customers based upon the customer information (block 604). The customer pickup order information may include prescription order information such as a prescription drug type and/or dosage, for example, as indicated in portions 504.1-504.M, as shown in FIG. 5 (block 604). The one or more processors may determine the pickup order information, for example, by correlating the received customer information to customer information stored with the customer's prescription information (block 604).

This correlation may be made, for example, through a correlation of one or more portions of the customer information to one or more portions of customer data associated with recently filled (or recently placed but unfilled) prescriptions (block 604). This correlation may be performed, for example, by any combination of drive-thru computing device 300 and one or more back-end components 118 (block 604). For example, this correlation may be performed locally by drive-thru computing device 300 (block 604). To provide another example, this correlation may be performed by one or more of back-end components 118 (block 604). To provide yet another example, this determination may be performed by drive-thru computing device 300 communicating with one or more back-end components 118 and/or mobile computing devices 112.1-112.M (block 604).

Method 600 may include one or more processors receiving ranging data corresponding to a signal transmitted by a transmitter that is positioned at a predetermined location within the drive-thru lane (block 606). This ranging data may include, for example, data indicative of a received signal strength corresponding to a signal received by a plurality of respective mobile computing devices within the drive-thru lane (block 606). Again, the ranging data may include data corresponding to an indication of a range between one more mobile computing devices and any suitable number of transmitters. The ranging data may be sent from one or more respective mobile computing devices associated with each of the plurality of customers, such as one or more mobile computing devices 112.1-112.M, for example, as shown in FIG. 1 (block 606). The ranging data may include, for example, any information suitable for identifying the position of each customer within the drive-thru lane, such as signal strength data (e.g., RSSI values), range information (e.g., near, intermediate, far, etc.) and/or positions calculated from one or more of the signal strength data and/or range information (block 606).

The one or more processors receiving the ranging data may include, for example, one or more portions of drive-thru computing device 300, such as CPU 302 working in conjunction with communication unit 312, for example, to receive the ranging data directly or indirectly from one or more mobile computing devices via, for example, links 109.1-109.M and communication network 116, respectively, for example, as shown in FIG. 1 (block 606). To provide another example, one or more processors receiving the ranging data may include any suitable portion of one or more back-end components, such as one or more back-end components 118, for example, receiving the ranging data from one or more mobile computing devices via a suitable communication network, such as communication network 116, for example, as shown in FIG. 1, (block 606).

Method 600 may include one or more processors determining a position of each of the plurality of customers within the drive-thru lane based upon the ranging data and the predetermined location of the transmitter (block 608). This determination may be made using any suitable calculation techniques, such as single transmitter signal strength values, multiple transmitter signal strength values, etc., as previously discussed with reference to FIGS. 4A-B (block 608). The determination of the position of each customer may be made by, for example, any combination of drive-thru computing device 300 and one or more back-end components 118 (block 608). For example, this determination may be performed locally by drive-thru computing device 300 (block 608) using the received ranging data (block 606). To provide another example, this determination may be performed by one or more of back-end components 118 using the received ranging data (block 606), which may in turn be sent to drive-thru computing device 300.

Method 600 may include one or more processors displaying a position of each of the plurality of customers within the drive-thru lane and their respective pickup order information (block 610). This may include, for example, any suitable display device (e.g., display 310 of drive-thru computing device 300) displaying any suitable portion of the customer information received (block 602) together with the pickup order information determined for each of the plurality of customers (block 604). The position of each of the plurality of customers within the drive-thru lane may be represented graphically and/or textually, as previously discussed with reference to FIG. 5, for example (block 610).

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

What is claimed is:

1. A method of determining a position of customers within an order pickup line, each of the customers being associated with a mobile computing device, the method comprising:
    determining, by one or more processors, pickup order information associated with each of the customers based upon customer information that is transmitted from each customer's respective mobile computing device identifying each respective customer;
    receiving, by the one or more processors, ranging data that is transmitted from each customer's respective mobile computing device, the ranging data being generated in response to receiving a transmitted signal from a transmitter that is positioned at a predetermined location within the order pickup line,
    wherein the ranging data is generated in accordance with a Bluetooth Low Energy (BLE) protocol that compares a calibrated received signal strength value included in the transmitted signal with a signal strength value of the transmitted signal when received at each customer's respective mobile computing device;
    determining, by the one or more processors, a position of each of the customers within the order pickup line based upon a comparison of the ranging data transmitted from each customer's respective mobile computing device; and
    displaying, by the one or more processors, the position of each of the customers within the order pickup line and each customer's respective pickup order information.

2. The method of claim 1, wherein the pickup order information is associated with a prescription order, and
    wherein the order pickup line is associated with a pharmacy location.

3. The method of claim 2, wherein the order pickup line is associated with a drive-thru lane at the pharmacy location.

4. The method of claim 1, wherein the pickup order information comprises one or more of:
    a prescription order;
    a type of prescription drug associated with the prescription order; or
    a prescription drug dosage.

5. The method of claim 1, further comprising:
    accessing, by the one or more processors, payment information associated with one of the customers within the order pickup line; and
    processing a payment of an order corresponding to the pickup order information associated with the one of the customers within the order pickup line.

6. The method of claim 5, wherein the act of processing the payment of the order includes processing the payment prior to the one of the customers within the order pickup line picking up the order.

7. The method of claim 1, wherein:
    the order pickup line includes (i) initial customers for which a position within the order pickup line has already been determined, and (ii) additional customers within the order pickup line for which a position has not yet been determined,
    the act of receiving the ranging data includes receiving ranging data that is transmitted from each initial customer's respective mobile computing device and each additional customer's respective mobile computing device, and
    the act of determining the position of each of the customers within the order pickup line includes determining the position of each of the initial customers and each of the additional customers based upon a comparison of the ranging data.

8. A non-transitory computer readable media having instructions stored thereon in a computing device to determine a position of customers within an order pickup line, each of the customers being associated with a mobile computing device, that when executed by a processor cause the processor to:
- determine pickup order information associated with each of the customers based upon customer information that is transmitted from each customer's respective mobile computing device identifying each respective customer;
- receive ranging data that is transmitted from each customer's respective mobile computing device, the ranging data being generated in response to receiving a transmitted signal from a transmitter that is positioned at a predetermined location within the order pickup line,
- wherein the ranging data is generated in accordance with a Bluetooth Low Energy (BLE) protocol that compares a calibrated received signal strength value included in the transmitted signal with a signal strength value of the transmitted signal when received at each customer's respective mobile computing device;
- determine a position of each of the customers within the order pickup line based upon a comparison of the ranging data transmitted from each customer's respective mobile computing device; and
- cause the position of each of the customers within the order pickup line and each customer's respective pickup order information to be displayed.

9. The non-transitory computer readable media of claim 8, wherein the pickup order information is associated with a prescription order, and
wherein the order pickup line is associated with a pharmacy location.

10. The non-transitory computer readable media of claim 9, wherein the order pickup line is associated with a drive-thru lane at the pharmacy location.

11. The non-transitory computer readable media of claim 8, wherein the pickup order information comprises one or more of:
- a prescription order;
- a type of prescription drug associated with the prescription order; or
- a prescription drug dosage.

12. The non-transitory computer readable media of claim 8, further including instructions that, when executed by the processor, cause the processor to:
- access payment information associated with one of the customers within the order pickup line; and
- process a payment of an order corresponding to the pickup order information associated with the one of the customers within the order pickup line.

13. The non-transitory computer readable media of claim 12, wherein instructions to process the payment of the order further cause the processor to:
- process the payment prior to the one of the customers within the order pickup line picking up the order.

14. The non-transitory computer readable media of claim 8, wherein:
- the order pickup line includes (i) initial customers for which a position within the order pickup line has already been determined, and (ii) additional customers within the order pickup line for which a position has not yet been determined,
- the instructions to receive the ranging data further causes the processor to receive ranging data that is transmitted from each initial customer's respective mobile computing device and each additional customer's respective mobile computing device, and
- the instructions to determine the position of each of the customers within the order pickup line includes further causes the processor to determine the position of each of the initial customers and each of the additional customers based upon a comparison of the ranging data.

15. A system for determining a position of customers within an order pickup line, comprising:
- a plurality of mobile computing devices, each of the plurality of mobile computing devices being associated with a respective one of the customers, and each mobile computing device from among the plurality of mobile computing devices being configured to execute an application to:
  - detect a signal transmitted by a transmitter positioned at a predetermined location within the order pickup line;
  - upon detecting the transmitted signal, generate ranging data in accordance with a Bluetooth Low Energy (BLE) protocol that compares a calibrated received signal strength value included in the transmitted signal with a signal strength value of the transmitted signal when received at the mobile computing device,
  - transmit (i) customer information identifying each respective customer, and (ii) the ranging data; and
- a retail computing device associated with the order pickup line, the retail computing device configured to:
  - determine pickup order information associated with each of the customers based upon customer information that is transmitted from each customer's respective mobile computing device identifying each respective customer;
  - determine a position of each of the customers within the order pickup line based upon a comparison of the ranging data transmitted from each customer's respective mobile computing device; and
  - display the position of each of the customers within the order pickup line and each customer's respective pickup order information.

16. The system of claim 15, wherein the pickup order information is associated with a prescription order, and
wherein the order pickup line is associated with a drive-thru lane at a pharmacy location.

17. The system of claim 15, wherein the pickup order information comprises one or more of:
- a prescription order;
- a type of prescription drug associated with the prescription order; or
- a prescription drug dosage.

18. The system of claim 15, wherein the retail computing device is further configured to access payment information associated with one of the customers within the order pickup line, and to process a payment of an order corresponding to the pickup order information associated with the one of the customers within the order pickup line.

19. The system of claim 18, wherein the retail computing device is further configured to process the payment prior to the one of the customers within the order pickup line picking up the order.

20. The system of claim 15, wherein:

the order pickup line includes (i) initial customers for which a position within the order pickup line has already been determined, and (ii) additional customers within the order pickup line for which a position has not yet been determined, and the retail computing device is further configured to receive ranging data that is transmitted from each initial customer's respective mobile computing device and each additional customer's respective mobile computing device, and to determine the position of each of the customers within the order pickup line includes determining the position of each of the initial customers and each of the additional customers based upon a comparison of the ranging data.

\* \* \* \* \*